H. YOUNG.
File.
No. 68,929.
Patented Sept. 17, 1867.
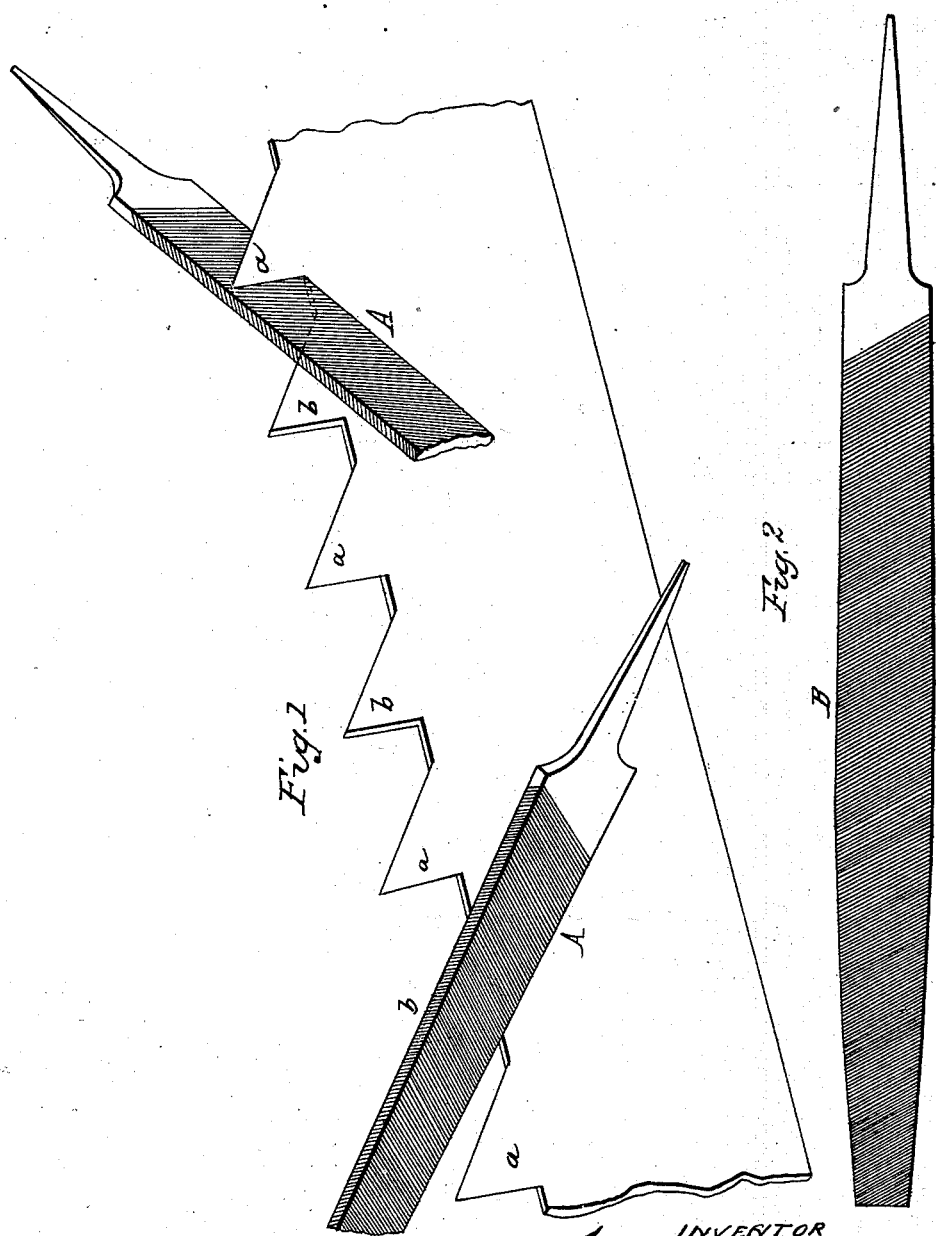

United States Patent Office.

HIRAM YOUNG, OF CAREY, OHIO.

*Letters Patent No. 68,929, dated September 17, 1867.*

---

IMPROVEMENT IN FILES.

---

*The Schedule referred to in these Letters Patent and making part of the same.*

---

TO ALL WHOM IT MAY CONCERN:

Be it known that I, HIRAM YOUNG, of Carey, in the county of Wyandott, and State of Ohio, have invented a new and improved Single-Cut File or Float; and I do hereby declare that the following is a full, clear, and exact description thereof, reference being had to the accompanying drawings, making a part of this specification, in which—

Figure 1 is a perspective view of a portion of a saw, showing the manner of applying the improved float to the teeth thereof.

Figure 2 is a view of one side of the float.

The object of this invention is to construct a single-cut file or float with its teeth running in oblique lines across the blade in one direction on both sides thereof, so that a single file can be conveniently used for sharpening the right and left bevelled cutting edges of the saw-teeth without reversing the file end for end in the hand; and while this is the case the oblique edges on the file will cut from the bases to the points of the saw-teeth, as will be hereinafter explained.

To enable others skilled in the art to understand my invention, I will describe its construction and operation.

The teeth are cut in oblique lines across the wide surfaces of the file-blade, which lines incline in the same direction on both sides of this blade, as indicated in figs. 1 and 2 by the letters A and B. On the left-hand side of the saw, represented in fig. 1, the teeth on the side A of the file-blade are represented as cutting the saw-tooth $a$ from the base to the point of its cutting edge. The lines of file-teeth incline backward or toward the person holding the file. On the right-hand side of the saw of fig. 1 the file is represented as applied with its surface B to the bevelled edge of the saw-tooth $a$, cutting from the base to the point of this tooth. The cutting edges of the file-teeth incline toward the tapering point of the blade, so as to cut only in one direction, *i. e.*, when the file is moved forward. These teeth represent a great number of sharp chisel-points which take their shavings from the saw-teeth, leaving their cutting edges very smooth and sharp, and free from notches or indentations.

I am aware that it is not new to employ single-cut files or floats for sharpening saw-teeth with the lines of teeth running obliquely across the blades, but in such instance separate file-blades were required for the right and left bevel-cutting edges of the saw-teeth. By having the lines of teeth to run in the same direction on both surfaces A and B of the file-blade, a single file-blade, the cutting edges and the inclined or back edges of the saw-teeth can be properly filed without turning or reversing the file in the hand. The lines of teeth upon the narrow edges of the file-blade are arranged in the same relation to each other as the teeth upon the under sides of the file-blade. In all cases where saw-teeth are sharpened the lines of teeth on the file must cut from the bases to the points of the saw-teeth, hence the convenience and advantage of having the lines of file-teeth to run obliquely across both sides of the file-blade in one and the same direction.

I do not claim a file made up of a series of flat blades, bevelled so as to act as teeth, said blades being arranged on a rod and clamped together, my invention only having reference to a single blade with lines of teeth cut into its faces or sides.

What I claim as my invention, and desire to secure by Letters Patent, is—

A "single-cut" right and left file, with the lines of its teeth on both sides of the blade all inclining in the same direction, substantially in the manner and for the purpose described.

HIRAM YOUNG.

Witnesses:
SAMUEL OGG,
C. W. D. ZROCK.